(12) United States Patent
Kim et al.

(10) Patent No.: US 12,246,579 B2
(45) Date of Patent: Mar. 11, 2025

(54) VAPOR INJECTION MODULE AND HEAT PUMP SYSTEM USING SAME

(71) Applicant: Hanon Systems, Daejeon (KR)

(72) Inventors: Seong Hun Kim, Daejeon (KR); Sung Je Lee, Daejeon (KR); Hae Jun Lee, Daejeon (KR)

(73) Assignee: HANON SYSTEMS, Daejeon (KR)

(*) Notice: Subject to any disclaimer, the term of this patent is extended or adjusted under 35 U.S.C. 154(b) by 60 days.

(21) Appl. No.: 18/014,614

(22) PCT Filed: Aug. 9, 2021

(86) PCT No.: PCT/KR2021/010488
§ 371 (c)(1),
(2) Date: Jan. 5, 2023

(87) PCT Pub. No.: WO2022/050586
PCT Pub. Date: Mar. 10, 2022

(65) Prior Publication Data
US 2023/0271477 A1 Aug. 31, 2023

(30) Foreign Application Priority Data
Sep. 7, 2020 (KR) .......... 10-2020-0113878

(51) Int. Cl.
*B60H 1/00* (2006.01)
*F25B 41/31* (2021.01)

(52) U.S. Cl.
CPC ..... *B60H 1/00899* (2013.01); *B60H 1/00392* (2013.01); *F25B 41/31* (2021.01); *F25B 2400/23* (2013.01); *F25B 2500/31* (2013.01)

(58) Field of Classification Search
CPC .. F25B 41/31; F25B 2400/23; F25B 2500/31; B60H 1/00899; B60H 1/00392
See application file for complete search history.

(56) References Cited

U.S. PATENT DOCUMENTS

| 4,881,718 A | 11/1989 | Champagne | |
|---|---|---|---|
| 2007/0144206 A1* | 6/2007 | Tsuboi | F25B 41/33 62/470 |

(Continued)

FOREIGN PATENT DOCUMENTS

| JP | 2007170783 A | 7/2007 |
|---|---|---|
| KR | 10-1996-0038319 A | 11/1996 |

(Continued)

*Primary Examiner* — Elizabeth J Martin
(74) *Attorney, Agent, or Firm* — NORTON ROSE FULBRIGHT US LLP

(57) ABSTRACT

A vapor injection module may include an expansion valve configured to allow a condensed refrigerant to pass therethrough or expand a condensed refrigerant in accordance with an air conditioning mode, and a gas-liquid separator configured to receive the refrigerant from the expansion valve and separate the refrigerant into a gaseous refrigerant and a liquid refrigerant, in which the expansion valve has a plurality of expansion regions and performs operations of allowing the refrigerant to pass therethrough, performing first-stage expansion on the refrigerant, or performing second-stage expansion on the refrigerant in accordance with arrangement positions of the expansion regions.

10 Claims, 12 Drawing Sheets

(56) References Cited

U.S. PATENT DOCUMENTS

| | | | | |
|---|---|---|---|---|
| 2012/0326064 A1* | 12/2012 | Sanuki | ............... | F25B 41/345 |
| | | | | 251/129.15 |
| 2014/0238067 A1* | 8/2014 | Itou | ............... | F25B 41/20 |
| | | | | 62/512 |
| 2015/0226340 A1* | 8/2015 | Klein | ............... | F16K 5/20 |
| | | | | 251/315.16 |

FOREIGN PATENT DOCUMENTS

| KR | 20160074674 A | 6/2016 |
|---|---|---|
| KR | 101679917 B1 | 11/2016 |

\* cited by examiner

VAPOR INJECTION MODULE AND HEAT PUMP SYSTEM USING SAME

CROSS REFERENCE TO RELATED APPLICATIONS

This application is a national phase under 35 U.S.C. § 371 of International Application No. PCT/KR2021/010488 filed on Aug. 9, 2021, which claims the benefit of priority from Korean Patent Application No. 10-2020-0113878 filed on Sep. 7, 2020. The entire contents of these applications are incorporated herein by reference in their entirety.

TECHNICAL FIELD

Embodiments disclosed herein relate to a vapor injection module and a heat pump system using the same. The embodiments relate to a vapor injection module capable of expanding a refrigerant, performing a bypass operation, and separating a gas and a liquid depending on an air conditioning mode by using a single ball valve, and a heat pump system using the same.

BACKGROUND ART

As development and research have been conducted on environmental-friendly technologies and alternative energy sources for replacing fossil raw materials, and electric vehicles and hybrid vehicles have been considered as most attractive fields in recent vehicle industries. Batteries are mounted in the electric vehicles and hybrid vehicles to provide driving power. The power of the battery is used not only to drive the vehicle, but also to cool or heat a vehicle interior.

When the battery is used as a heat source for cooling or heating the interior of the vehicle that provides driving power by using the battery, the traveling distance decreases to that extent. To solve this problem, a method of applying a heat pump system, which has been widely used as a domestic cooling or heating device in the related art, to the vehicle has been proposed.

For reference, the heat pump refers to a process of absorbing low-temperature heat and transferring the absorbed heat to a high-temperature location. For example, the heat pump implements a cycle in which a liquid refrigerant becomes a gaseous refrigerant by evaporating in an evaporator and absorbing heat from the surrounding, and the gaseous refrigerant becomes the liquid refrigerant by dissipating heat to the surrounding by means of a condenser. The application of the heat pump to the electric or hybrid vehicle may advantageously ensure an insufficient heat source in a general air conditioning casing in the related art.

When an outside air temperature is too low during a process of heating a vehicle interior by using the heat pump system, the heating ability significantly deteriorates. This is caused by an insufficient heat absorbing source. When the amount of gaseous refrigerant to be transmitted to a compressor is insufficient, the heating efficiency deteriorates.

Various studies have been performed by vehicle manufacturers in many countries to solve the above-mentioned problems. For example, a method of improving heating performance by using a PTC heater and a method of improving heating performance by using waste heat of electrical components have been used in some instances. However, even the methods in the related art are not effective in solving a problem of deterioration in heating performance during a heat pump defrosting operation. Further, a method, which unilaterally consumes a battery, is mainly used to improve heating performance, but this method causes a problem of significant deterioration in drivability of the battery.

DISCLOSURE

Technical Problem

An object of an embodiment is to provide a vapor injection module capable of improving heating efficiency even in a cryogenic state with a low outside air temperature.

Another object of the embodiment is to provide a vapor injection module, in which a refrigerant bypasses a gas-liquid separator (LGS) in an interior cooling and non-vapor injection mode, thereby implementing excellent heating efficiency without an unnecessary pressure drop.

Still another object of the embodiment is to reduce costs and simplify a module by performing two-stage expansion by using a single ball valve and an actuator.

Technical problems to be solved by the present invention are not limited to the above-mentioned technical problems, and other technical problems, which are not mentioned above, may be clearly understood by those skilled in the art from the following descriptions.

Technical Solution

An embodiment of the present invention provides a vapor injection module including: an expansion valve configured to allow a condensed refrigerant to pass therethrough or expand a condensed refrigerant in accordance with an air conditioning mode; and a gas-liquid separator configured to receive the refrigerant from the expansion valve and separate the refrigerant into a gaseous refrigerant and a liquid refrigerant, in which the expansion valve has a plurality of expansion regions and performs operations of allowing the refrigerant to pass therethrough, performing first-stage expansion on the refrigerant, or performing second-stage expansion on the refrigerant in accordance with arrangement positions of the expansion regions.

In particular, the vapor injection module may further include: an actuator connected to the expansion valve and configured to control a position of the expansion valve.

In particular, in a cooling mode among the air conditioning modes, the expansion valve may prevent the condensed refrigerant from flowing to the gas-liquid separator and allow the condensed refrigerant to pass therethrough.

In particular, in a general heating mode (non-vapor injection) among the air conditioning modes, the expansion valve may prevent the condensed refrigerant from flowing to the gas-liquid separator and expand the condensed refrigerant.

In particular, in a vapor injection heating mode among the air conditioning modes, the expansion valve primarily may expand the condensed refrigerant and move the refrigerant to the gas-liquid separator, and the liquid refrigerant separated by the gas-liquid separator may be secondarily expanded while passing through the expansion valve.

In particular, the gas-liquid separator may separate the refrigerant into the gaseous refrigerant and the liquid refrigerant only in a vapor injection heating mode among the air conditioning modes including a cooling mode, a general heating mode, and the vapor injection heating mode.

In particular, the expansion valve may include a ball valve connected to an inlet port and configured to rotate, and the plurality of expansion regions may be formed in the ball valve.

In particular, the ball valve may include: a connection hole connected to the inlet port; a first expansion region connected to the connection hole and configured to expand the refrigerant; and a second expansion region disposed at one side of the ball valve.

The second expansion region may be formed as a through-hole formed through the ball valve.

In particular, the first expansion region may have a pair of groove structures disposed at an end of the connection hole so as to face each other.

In particular, the expansion valve may include an outlet port, and in a cooling mode and a general heating mode among the air conditioning modes, the ball valve may be rotated so that the second expansion region is not directed toward the outlet port.

In particular, the expansion valve may include an outlet port, the gas-liquid separator and the expansion valve may be connected through a movement passage, and in a vapor injection heating mode among the air conditioning modes, the second expansion region of the ball valve may be rotated to connect the outlet port and the movement passage.

In particular, the gas-liquid separator may include: a housing having an internal space in which a refrigerant flows; an outflow passageway disposed at an upper side of the housing and configured to discharge the gaseous refrigerant, the outflow passageway being provided in the form of a pipe to prevent an inflow of the liquid refrigerant; and a movement passage disposed at a lower side of the housing and configured to discharge the liquid refrigerant to the ball valve.

In particular, a connection passage connected to the housing may be disposed so that the refrigerant introduced through the ball valve is discharged toward a sidewall of the housing.

A partition wall part may be disposed at one side of the housing and configured to prevent the refrigerant from scattering.

Another embodiment of the present invention provides a vapor injection heat pump system including: a compressor configured to compress and discharge a refrigerant; a condenser configured to condense the compressed refrigerant; an expansion valve configured to block a flow of the condensed refrigerant or expand the condensed refrigerant and transmit the refrigerant to a gas-liquid separator in accordance with an air conditioning mode; the gas-liquid separator configured to receive the refrigerant from the expansion valve and separate the refrigerant into a gaseous refrigerant and a liquid refrigerant; an external heat exchanger configured to condense or evaporate the refrigerant transmitted from the expansion valve; a second expansion valve configured to control a movement direction of and whether to expand the refrigerant transmitted from the external heat exchanger in accordance with the air conditioning mode; and an evaporator configured to cool an interior by using the refrigerant transmitted from the second expansion valve, in which the expansion valve uses a plurality of expansion regions to perform operations of allowing the refrigerant to pass therethrough, performing first-stage expansion on the refrigerant, or performing second-stage expansion on the refrigerant in accordance with the air conditioning mode.

In particular, the expansion valve may include a ball valve connected to an inlet port and configured to rotate, and the plurality of expansion regions may be formed in the ball valve.

In particular, the ball valve may include: a connection hole connected to the inlet port; a first expansion region disposed at an end of the connection hole; and a second expansion region disposed at one side of the ball valve.

In particular, the first expansion region may have a pair of groove structures disposed at an end of the connection hole so as to face each other.

The second expansion region may be formed as a through-hole formed through the ball valve.

In particular, in case that the air conditioning mode is a cooling mode, the expansion valve may prevent the condensed refrigerant from flowing to the gas-liquid separator and allow the condensed refrigerant to pass therethrough.

In particular, in case that the air conditioning mode is a general heating mode (non-vapor injection), the expansion valve may prevent the condensed refrigerant from flowing to the gas-liquid separator and expand the condensed refrigerant.

In particular, in a vapor injection heating mode among the air conditioning modes, the expansion valve primarily may expand the condensed refrigerant by using the first expansion region and move the refrigerant to the gas-liquid separator, and the liquid refrigerant separated by the gas-liquid separator may be secondarily expanded by the second expansion region while passing through the expansion valve.

In particular, the vapor injection heat pump system may further include: a third expansion valve connected to the second expansion valve in parallel; and a chiller connected to the third expansion valve and configured to allow the refrigerant and a coolant to exchange heat with each other.

In particular, the vapor injection heat pump system may further include an internal heat exchanger configured to heat the interior by using the refrigerant compressed by the compressor.

In particular, the evaporator and the internal heat exchanger may be disposed in an air conditioning casing.

In particular, the refrigerant in the internal heat exchanger may exchange heat with air, and the air, which has exchanged heat with refrigerant, may be introduced into the interior and heat the interior.

In particular, the refrigerant in the internal heat exchanger may exchange heat with a coolant, and the coolant, which has exchanged heat with the refrigerant, may exchange heat with the air for heating the interior.

In particular, the vapor injection heat pump system may further include: a water-cooled condenser configured to allow the coolant and the refrigerant discharged from the internal heat exchanger to exchange heat with each other.

Advantageous Effects

According to the embodiment, it is possible to improve the heating efficiency even in a cryogenic state with a low outside air temperature.

In particular, the refrigerant bypasses the gas-liquid separator in the interior cooling and non-vapor injection mode, which makes it possible to improve heating efficiency without an unnecessary pressure drop.

In addition, it is possible to reduce costs and simplify the module by improving the structure in the related art.

The various, beneficial advantages and effects of the present invention are not limited to the above-mentioned contents and may be more easily understood during the process of describing the specific embodiments of the present invention.

MODE FOR INVENTION

Figure 1:
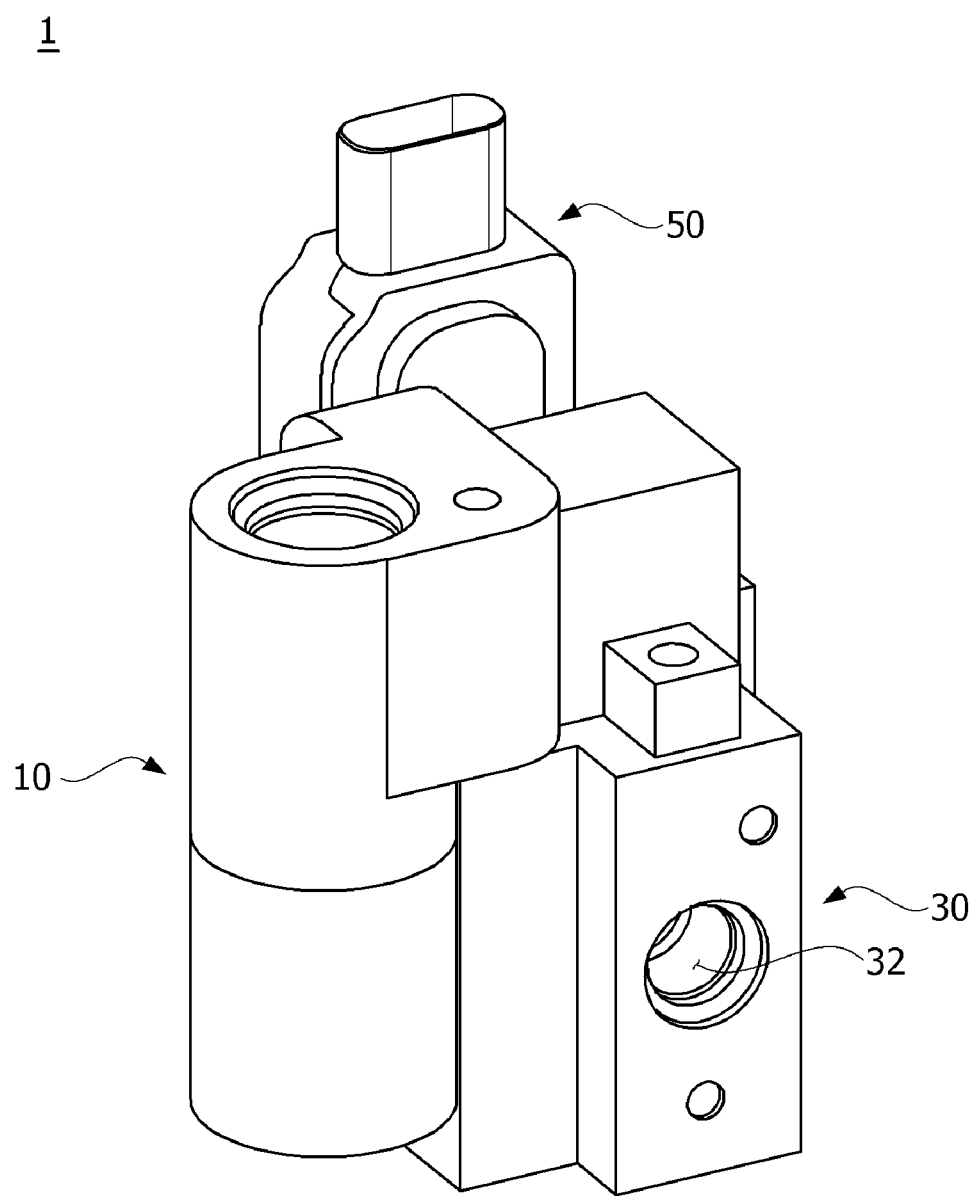
FIG. 1 is a perspective view of a vapor injection module according to an embodiment of the present invention.

Hereinafter, exemplary embodiments of the present invention will be described in detail with reference to the accompanying drawings.

However, the technical spirit of the present invention is not limited to some embodiments described herein but may be implemented in various different forms. One or more of the constituent elements in the embodiments may be selectively combined and substituted within the scope of the technical spirit of the present invention.

In addition, unless otherwise specifically and explicitly defined and stated, the terms (including technical and scientific terms) used in the embodiments of the present invention may be construed as the meaning which may be commonly understood by the person with ordinary skill in the art to which the present invention pertains. The meanings of the commonly used terms such as the terms defined in dictionaries may be interpreted in consideration of the contextual meanings of the related technology.

In addition, the terms used in the embodiments of the present invention are for explaining the embodiments, not for limiting the present invention.

In the present specification, unless particularly stated otherwise, a singular form may also include a plural form. The expression "at least one (or one or more) of A, B, and C" may include one or more of all combinations that can be made by combining A, B, and C.

In addition, the terms first, second, A, B, (a), and (b) may be used to describe constituent elements of the embodiments of the present invention.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element can be connected, coupled, or attached directly to another constituent element or connected, coupled, or attached to another constituent element through still another constituent element interposed therebetween.

In addition, the explanation "one constituent element is formed or disposed above (on) or below (under) another constituent element" includes not only a case in which the two constituent elements are in direct contact with each other, but also a case in which one or more additional constituent elements are formed or disposed between the two constituent elements. In addition, the expression "above (on) or below (under)" may include a meaning of a downward direction as well as an upward direction based on one constituent element.

Hereinafter, embodiments will be described in detail with reference to the accompanying drawings. The same or corresponding constituent elements are assigned with the same reference numerals regardless of reference numerals, and the repetitive description thereof will be omitted.

FIGS. 1 to 12 clearly illustrate only main features for conceptually and clearly understanding the present invention. As a result, various modifications of the drawings are expected, and the scope of the present invention need not be limited to particular shapes illustrated in the drawings.

Figure 2:
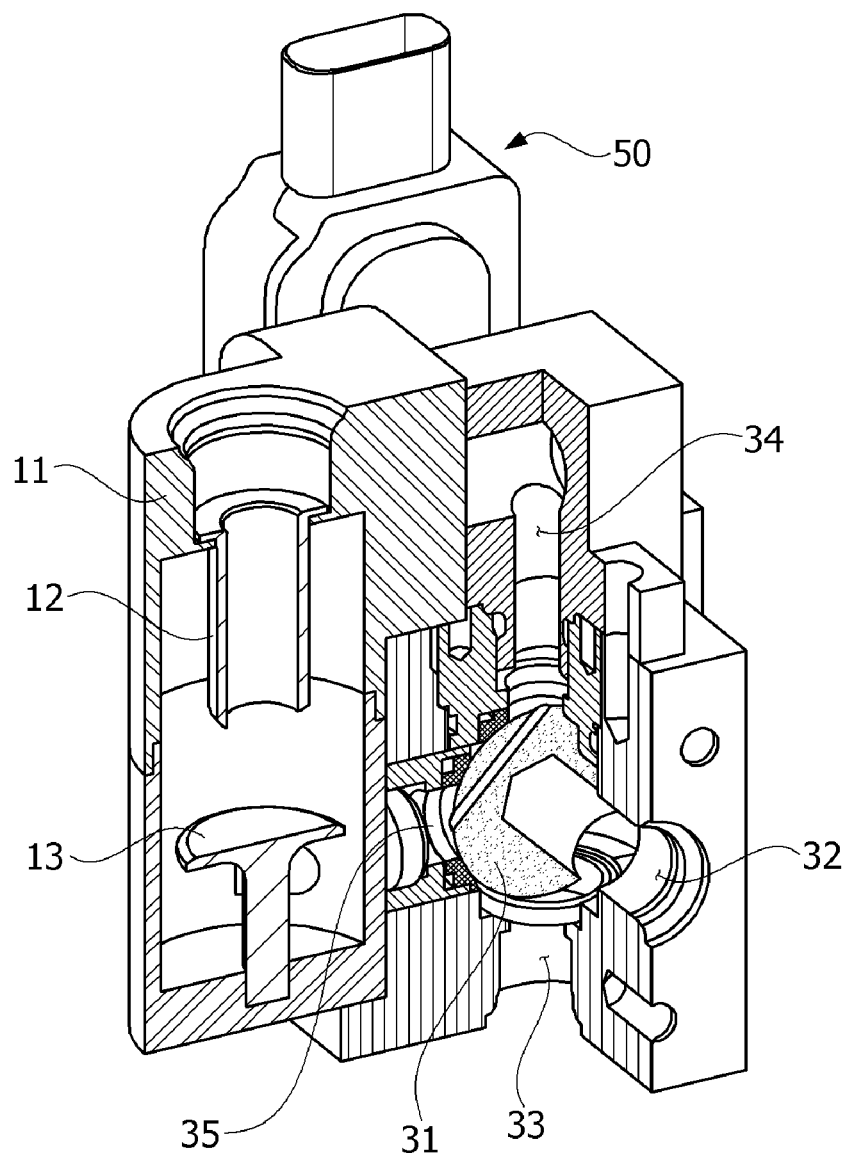
FIG. 2 is a view illustrating an internal structure of FIG. 1.
Figure 3:
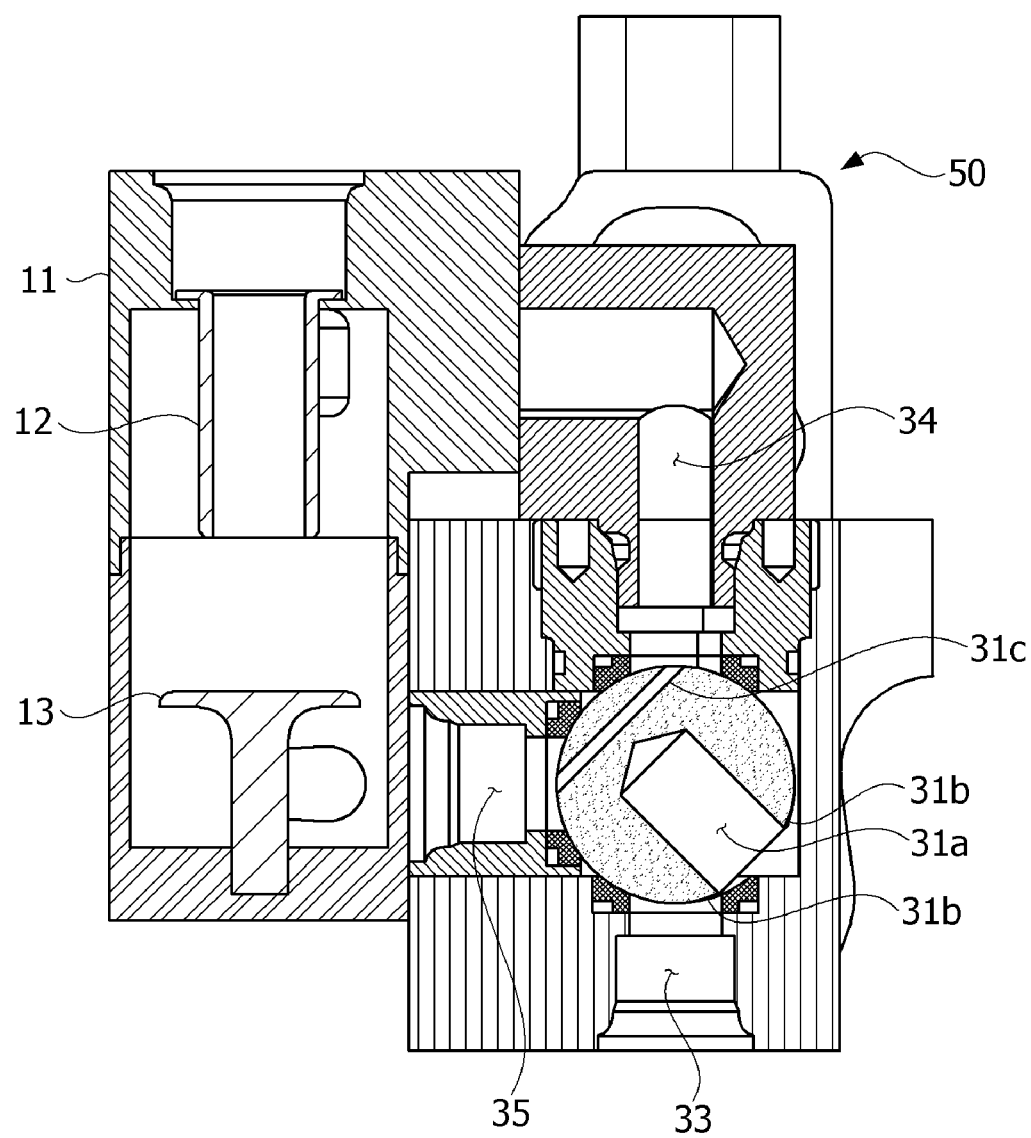
FIG. 3 is a view illustrating an internal cross-section of FIG. 1.
Figure 4:
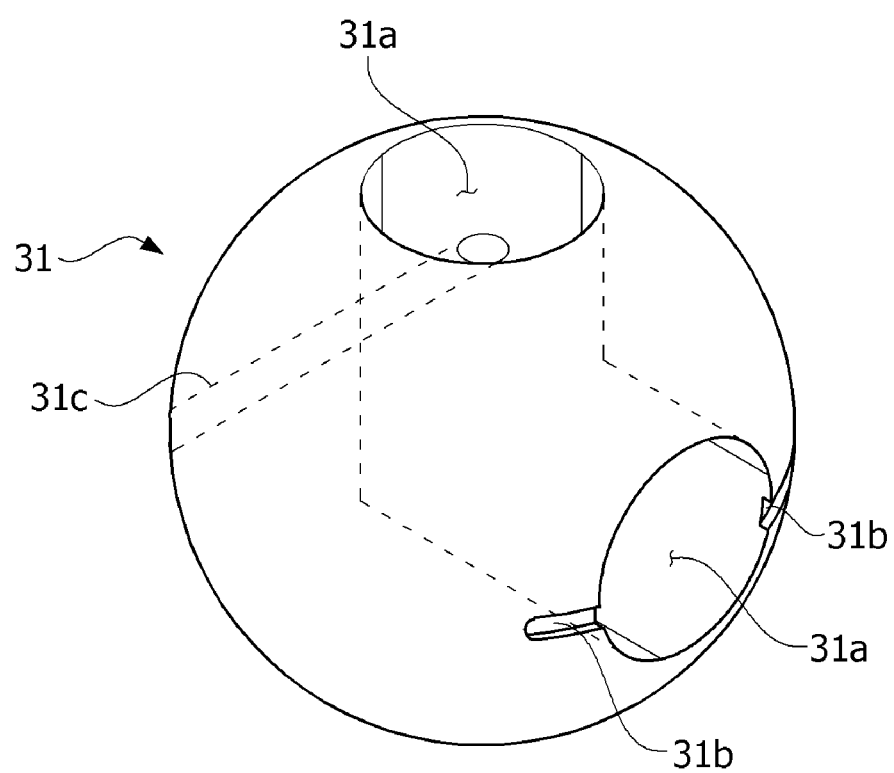
FIG. 4 is a view illustrating a structure of a ball valve that is a constituent element of FIG. 1.
Figure 5:
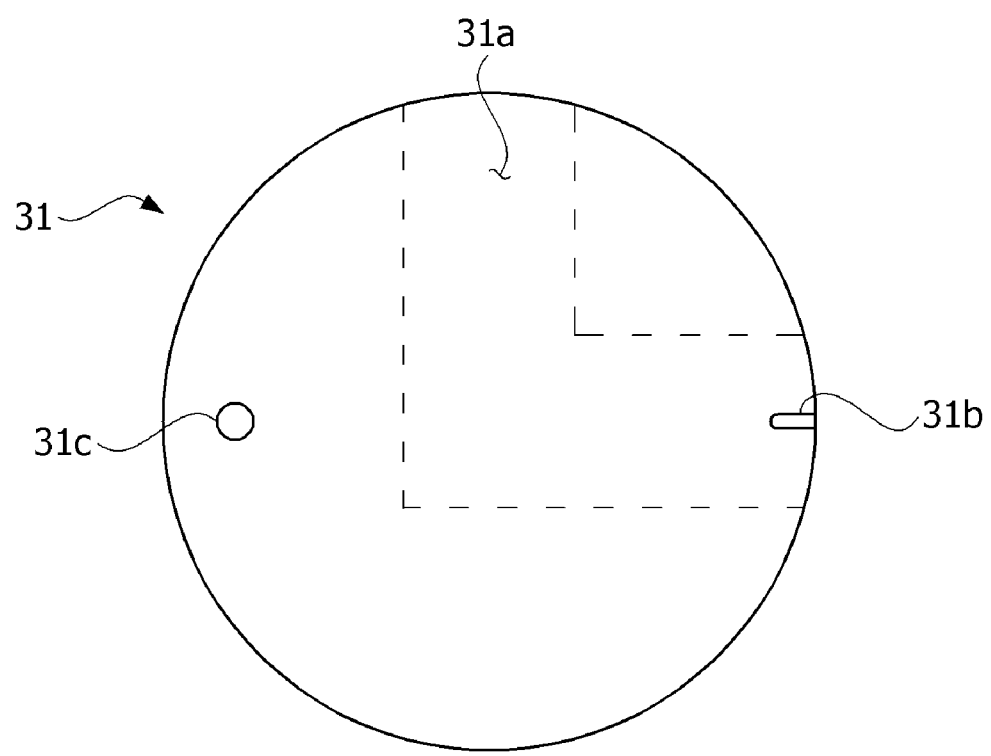
FIG. 5 is a view illustrating a lateral side of FIG. 4.
Figure 6:
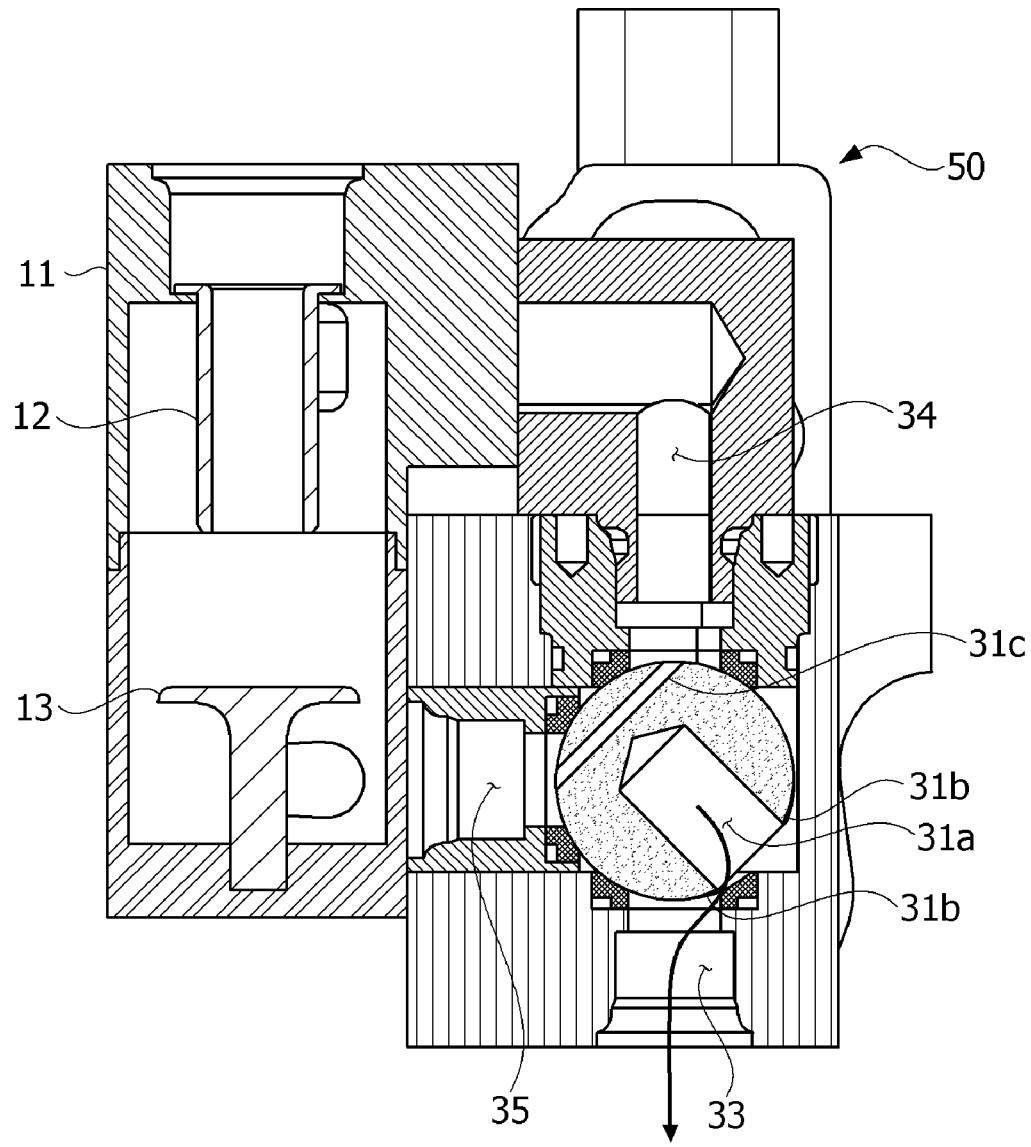
FIG. 6 is a view illustrating a flow of a refrigerant in case that an air conditioning mode is a general heating mode in FIG. 3.
Figure 7:
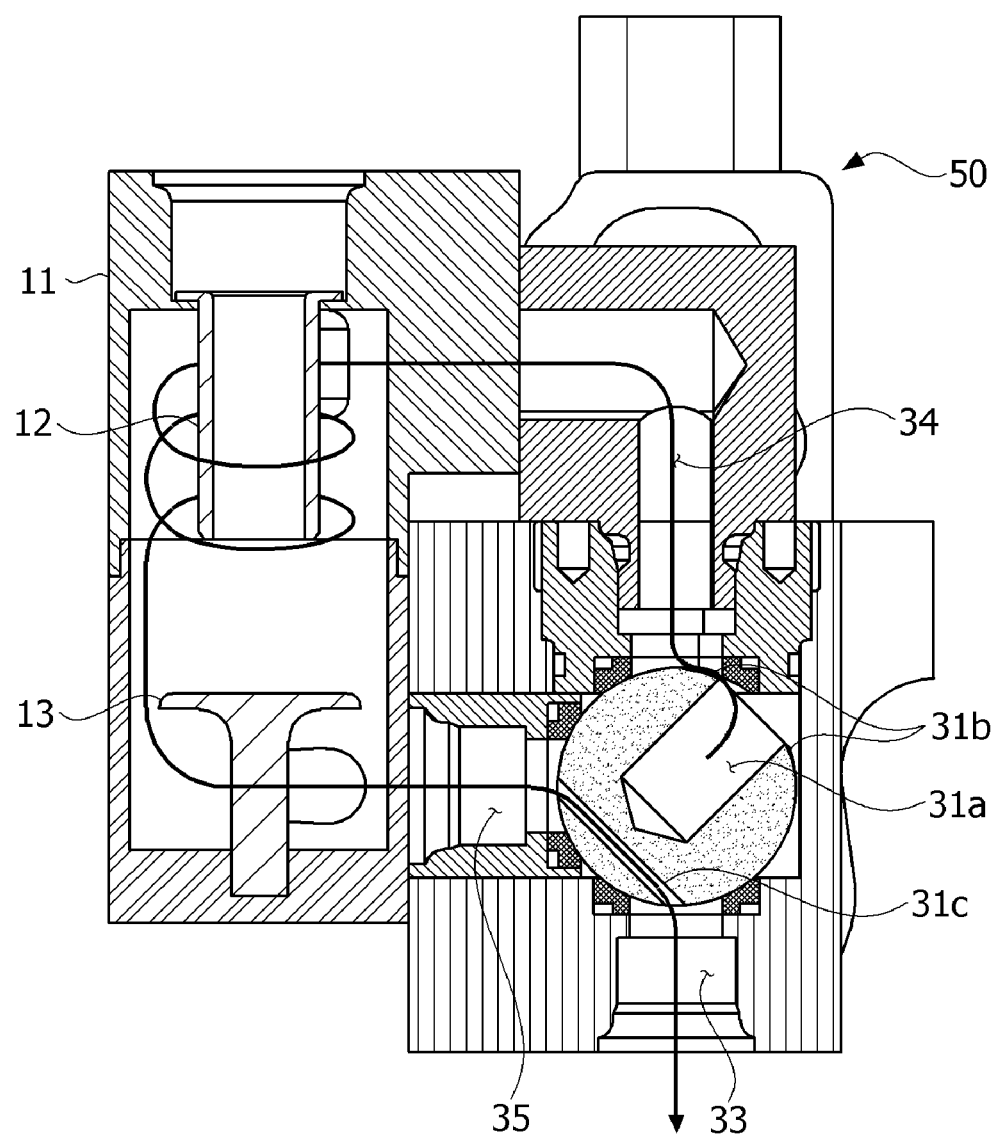
FIG. 7 is a view illustrating a flow of the refrigerant in case that the air conditioning mode is a vapor injection heating mode in FIG. 3.
Figure 8:
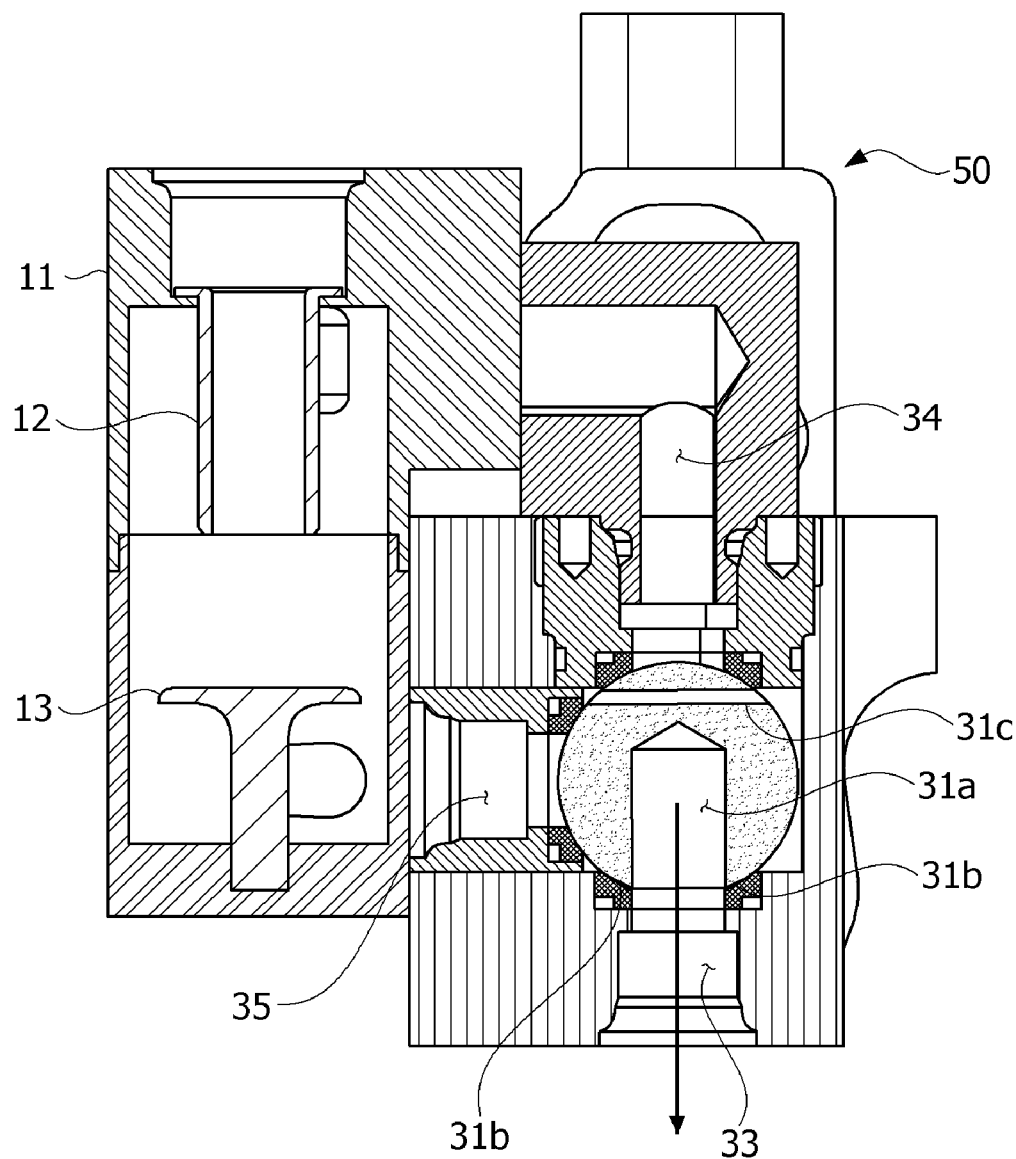
FIG. 8 is a view illustrating a flow of the refrigerant in case that the air conditioning mode is a cooling mode in FIG. 3.

FIG. 1 is a perspective view of a vapor injection module according to an embodiment of the present invention, FIG. 2 is a view illustrating an internal structure of FIG. 1, FIG. 3 is a view illustrating an internal cross-section of FIG. 1, FIG. 4 is a view illustrating a structure of a ball valve that is a constituent element of FIG. 1, FIG. 5 is a view illustrating a lateral side of FIG. 4, FIG. 6 is a view illustrating a flow of a refrigerant in case that an air conditioning mode is a general heating mode in FIG. 3, FIG. 7 is a view illustrating a flow of the refrigerant in case that the air conditioning mode is a vapor injection heating mode in FIG. 3, and FIG. 8 is a view illustrating a flow of the refrigerant in case that the air conditioning mode is a cooling mode in FIG. 3.

Referring to FIGS. 1 to 9, a vapor injection module 1 according to an embodiment of the present invention may include an expansion valve 30, a gas-liquid separator 10, and an actuator 50.

The vapor injection module 1 according to the embodiment of the present invention is characterized by adjusting arrangement positions of a plurality of expansion regions provided in the expansion valve 30 in accordance with an air conditioning mode by using the single actuator 50, and performing operations of allowing the refrigerant to pass therethrough, performing first-stage expansion on the refrigerant, or performing second-stage expansion on the refrigerant in accordance with the arrangement positions of the expansion regions.

The expansion valve 30 may allow the condensed refrigerant to pass therethrough or expand the condensed refrigerant in accordance with the air conditioning mode.

The expansion valve 30 may include: an inlet port 32 into which the refrigerant is introduced; a ball valve 31 disposed in the expansion valve 30; an outlet port 33 through which the refrigerant having passed through the ball valve 31 is discharged; a connection passage 34 through which the refrigerant introduced through the inlet port 32 flows to the gas-liquid separator 10; and a movement passage 35 through which a liquid refrigerant separated in the gas-liquid separator 10 flows into the ball valve 31.

The ball valve 31 may have the plurality of expansion regions. The ball valve 31 may allow the refrigerant introduced through the inlet port 32 to pass therethrough (bypass)

or expand the refrigerant introduced through the inlet port 32. The ball valve 31 may adjust a movement direction of the refrigerant.

In one embodiment, the ball valve 31 may include: a connection hole 31a connected to the inlet port 32 and configured to serve as a passageway through which the refrigerant flows; a first expansion region 31b disposed at an end of the connection hole 31a; and a second expansion region 31c disposed at one side of the ball valve 31.

The connection hole 31a provides a passageway through which the condensed refrigerant introduced from the outside flows. In one embodiment, the connection hole 31a may have a shape curved at 90 degrees, but the present invention is not limited thereto. Various modifications may be made in accordance with arrangement positions of the connection passage 34 and the outlet port 33.

A first expansion region 31b and a second expansion region 31c, which are defined in the ball valve 31, serve to expand the refrigerant.

The first expansion region 31b may be connected to the connection hole 31a. The first expansion region 31b may expand the refrigerant introduced through the inlet port 32 and discharge the refrigerant to the gas-liquid separator 10 or an outflow hole.

In one embodiment, the first expansion region 31b may have a groove structure. The first expansion region 31b having the groove structure may define a passageway and an inner wall that surrounds the ball valve 31 and expand the refrigerant by using a change in pressure when the refrigerant flows.

In addition, the first expansion region 31b may be provided as a pair of first expansion regions 31b that faces an end of the connection hole 31a. The first expansion regions 31b, which is disposed to face the end of the connection hole 31a, may expand the refrigerant as the ball valve 31 rotates, and the first expansion regions 31b may discharge the refrigerant to the connection passage 34 or the outlet port 33. The first expansion regions 31b formed at two opposite sides may reduce the motion of the ball valve 31.

The groove structure is illustrated in the present invention, but the present invention is not limited thereto. A hole structure may be formed through one side of the connection hole 31a.

The second expansion region 31c may be disposed at one side of the ball valve 31. In one embodiment, the second expansion region 31c may be formed as a through-hole formed through the ball valve 31. The second expansion region 31c may be disposed to be eccentric from a center of the ball valve 31 and have a straight structure so as not to hinder a flow of the refrigerant. In addition, the second expansion region 31c having the through-hole structure is smaller than a diameter of the movement passage 35, such that the refrigerant may be expanded by pressure while passing through the movement passage 35.

When the ball valve 31 rotates at a preset angle, the second expansion region 31c may connect the outlet port 33 and the movement passage 35, through which the liquid refrigerant separated in the gas-liquid separator 10 flows, such that the refrigerant may be expanded and discharged to the outlet port 33.

The structures or shapes of the connection passage 34 and the movement passage 35 are not limited. The connection passage 34 may operate as a passageway through which the refrigerant expanded by the ball valve 31 flows to the gas-liquid separator 10. The movement passage 35 may operate as a passageway through which the liquid refrigerant separated in the gas-liquid separator 10 flows to the ball valve.

Referring to FIGS. 4 and 5, when an inlet of the connection hole 31a of the ball valve 31 is directed toward the inlet port 32, an outlet of the connection hole 31a may be disposed at a position bent at 90 degrees. The first expansion regions 31b may be disposed at an end of the outlet of the connection hole 31a so as to face each other.

In addition, the second expansion region 31c may be disposed to be opposite to an outlet of the connection hole 31a. The second expansion region 31c may have a through-hole structure formed through one side of the ball valve 31.

The gas-liquid separator 10 may receive the refrigerant from the expansion valve 30 and separate the refrigerant into a gaseous refrigerant and a liquid refrigerant. The gas-liquid separator 10 may move the separated gaseous refrigerant to a compressor 100 and move the liquid refrigerant to the ball valve 31.

The gas-liquid separator 10 may include a housing 11, an outflow passage 12, and the movement passage 35.

The housing 11 provides an internal space in which the refrigerant flows. The housing 11 has a cylindrical structure, and an inner wall of the housing 11 may have an inclination. The inclination may decrease a radius of the housing toward a lower side of the housing, thereby providing an effect of correcting a flow velocity.

An outflow hole may be disposed at an upper side of the housing 11, and the movement passage 35 may be formed at the lower side of the housing 11.

The outflow passage 12 may be connected to the outflow hole, and the gaseous refrigerant may flow to the outflow hole through the outflow passage 12.

The connection passage 34 may be connected to one region of the upper side of the housing 11. The connection passage 34 may be disposed such that the refrigerant is discharged toward a sidewall of the housing 11, thereby defining a circulation of the refrigerant. The refrigerant discharged from the connecting passage 34 flows downward while spirally flowing along a sidewall of the outflow passage 12.

The movement passage 35 may provide a passageway through which the refrigerant liquefied in the housing 11 flows toward the second expansion region 31c disposed in the ball valve 31.

The partition wall part 13 may be disposed at one side of the movement passage 35, i.e., one side of the housing 11 and prevent the refrigerant from scattering.

The partition wall part 13 may be positioned at a central portion of the housing 11, i.e., a lower side of the outflow passage 12 and prevent the refrigerant flowing through the movement passage from scattering and being introduced into the outflow passage 12. In one embodiment, the partition wall part 13 may have a structure of a circular plate and have a diameter larger than a diameter of the outflow passage 12. A shape of the partition wall part 13 is not limited, but the partition wall part 13 may be larger in cross-section than the outflow passage 12. The partition wall part 13 may be variously modified depending on a cross-sectional shape of the outflow passage 12.

In addition, a fixing part may be connected to the partition wall part 13, such that the partition wall part 13 may be fixed to the housing 11. In one embodiment, the fixing part may have a rod structure. The fixing part may be fixed by a structure having one side connected to the partition wall part 13, and the other side fixed to the housing 11.

The actuator 50 may be connected to the expansion valve 30 and control the position of the expansion valve 30. In one embodiment, the actuator 50 may control the position of the first expansion region 31*b* and the position of the second expansion region 31*c* by rotating the ball valve 31 disposed in the expansion valve 30.

The structure or operation of the actuator 50 is not limited, and the structure or operation of the actuator 50 may be variously modified.

Hereinafter, an operation of the vapor injection module 1 according to the air conditioning mode will be described.

FIG. 6 is a view illustrating a flow of a refrigerant in case that the air conditioning mode is a general heating mode in FIG. 3.

Referring to FIG. 6, in case that the air conditioning mode is a general heating mode (non-vapor injection), the expansion valve 30 may prevent the condensed refrigerant from flowing to the gas-liquid separator 10, expand the condensed refrigerant, and discharge the condensed refrigerant.

A detailed operation will be described. The refrigerant is introduced through the inlet port 32, and the refrigerant introduced into the inlet of the connection hole 31*a* flows to the outlet of the connection hole 31*a*. The actuator 50 may adjust the arrangement position of the first expansion region 31*b* formed at the end of the outlet port 33 by rotating the ball valve 31 and operate to discharge the refrigerant toward the outlet port 33 through the first expansion region 31*b*.

In this case, the position of the second expansion region 31*c* may be controlled so that the inlet or the outlet of the second expansion region 31*c* is not directed toward the outlet port 33. In one embodiment, the inlet and the outlet of the second expansion region 31*c* may be disposed to be directed toward the connection passage 34 and the movement passage 35 where the inflow and outflow of refrigerant do not occur.

FIG. 7 is a view illustrating a flow of the refrigerant in case that the air conditioning mode is a vapor injection heating mode in FIG. 3.

Referring to FIG. 7, in case that the air conditioning mode is the vapor injection heating mode, the expansion valve 30 may primarily expand the condensed refrigerant and move the refrigerant to the gas-liquid separator 10, and the liquid refrigerant separated by the gas-liquid separator 10 may be secondarily expanded while passing through the expansion valve 30.

A detailed operation will be described. The refrigerant is introduced through the inlet port 32, and the refrigerant introduced into the inlet of the connection hole 31*a* flows to the outlet of the connection hole 31*a*. The actuator 50 may adjust the arrangement position of the first expansion region 31*b* formed at the end of the outlet port 33 by rotating the ball valve 31 and allow the refrigerant to flow to the connection passage 34 through the first expansion region 31*b*. The refrigerant flowing through the connection passage 34 is expanded to a middle pressure while passing through the first expansion region 31*b* and introduced into the gas-liquid separator 10. The first expansion region 31*b* may expand the introduced refrigerant to a middle pressure and reduce a load applied to the compressor 100, thereby improving heat exchange efficiency in an evaporator 600.

The refrigerant introduced into the gas-liquid separator 10 may flow downward while circulating along the sidewall of the housing 11 of the gas-liquid separator 10. The liquid refrigerant separated in the gas-liquid separator 10 may flow toward the movement passage 35, and the separated gaseous refrigerant may be discharged through the outflow passage 12.

The liquid refrigerant flowing through the movement passage 35 is secondarily expanded while passing through the second expansion region 31*c* of the ball valve 31. The refrigerant passing through the second expansion region 31*c* may be expanded to a low pressure and discharged to the outlet port 33.

In the present invention, the first expansion region 31*b* and the second expansion region 31*c* are disposed in the single ball valve 31, and the position of the ball valve 31 is controlled by the actuator 50 so that the second-stage expansion is performed by the single ball valve 31, which makes it possible to reduce costs.

In addition, to perform the two-stage expansion, the single expansion valve 30 and the single actuator are used to perform the second-stage expansion in the structure in which the plurality of expansion valves 30 and the plurality of actuators 50 for operating the expansion valves 30 are used, which makes it possible to reduce the costs.

FIG. 8 is a view illustrating a flow of the refrigerant in case that the air conditioning mode is a cooling mode in FIG. 3.

Referring to FIG. 8, in case that the air conditioning mode is the cooling mode, the expansion valve 30 may prevent the condensed refrigerant from flowing to the gas-liquid separator 10 and allow the condensed refrigerant to pass therethrough.

A detailed operation will be described. The refrigerant is introduced through the inlet port 32, and the refrigerant introduced into the inlet of the connection hole 31*a* flows to the outlet of the connection hole 31*a*. The actuator 50 rotates the ball valve 31 so that the outlet of the connection hole 31*a* is disposed to be directed toward the outlet port 33, such that the bypass operation may be performed on the introduced refrigerant.

In this case, the position of the second expansion region 31*c* may be controlled so that the inlet or the outlet of the second expansion region 31*c* is not directed toward the outlet port 33. In one embodiment, the inlet and the outlet of the second expansion region 31*c* may be disposed to be directed toward the sidewall on which the ball valve 31 is disposed.

Meanwhile, a vapor injection heat pump system using a vapor injection module 1 according to another embodiment of the present invention will be described below with reference to the accompanying drawings. A description of the configuration identical to the configuration of the vapor injection module 1 according to the above-mentioned embodiment of the present invention will be omitted.

Figure 9:
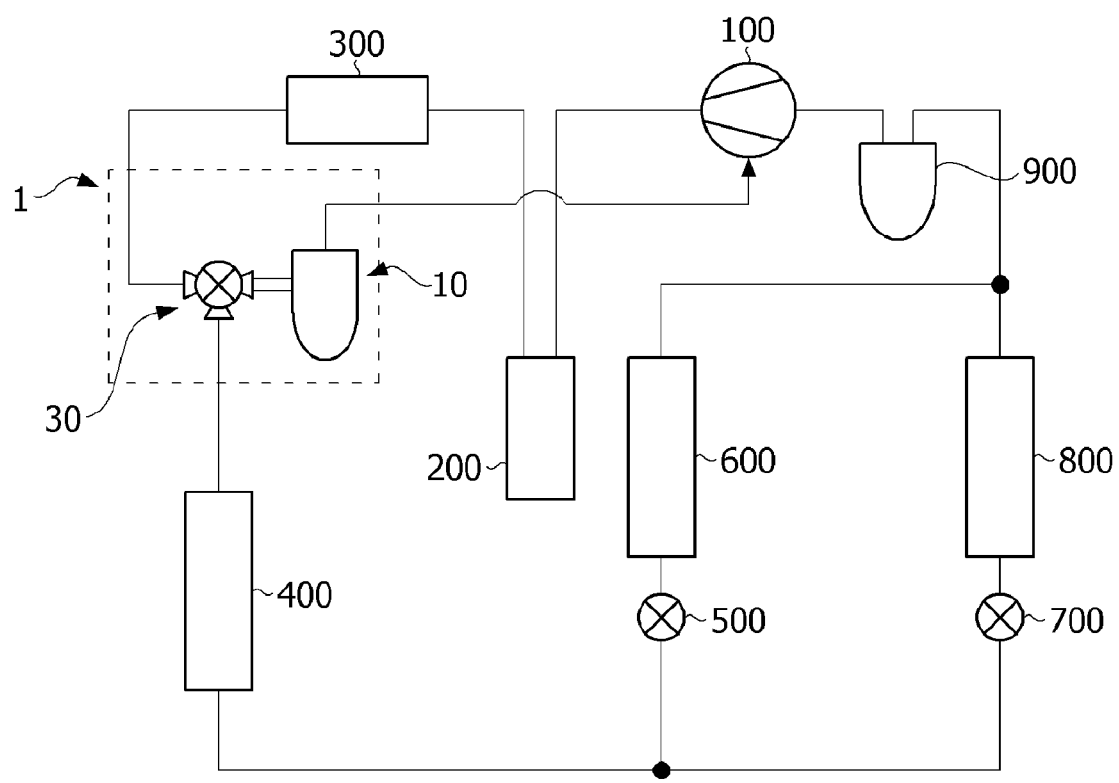
FIG. 9 is a structural view of a vapor injection heat pump system according to another embodiment of the present invention.
Figure 10:
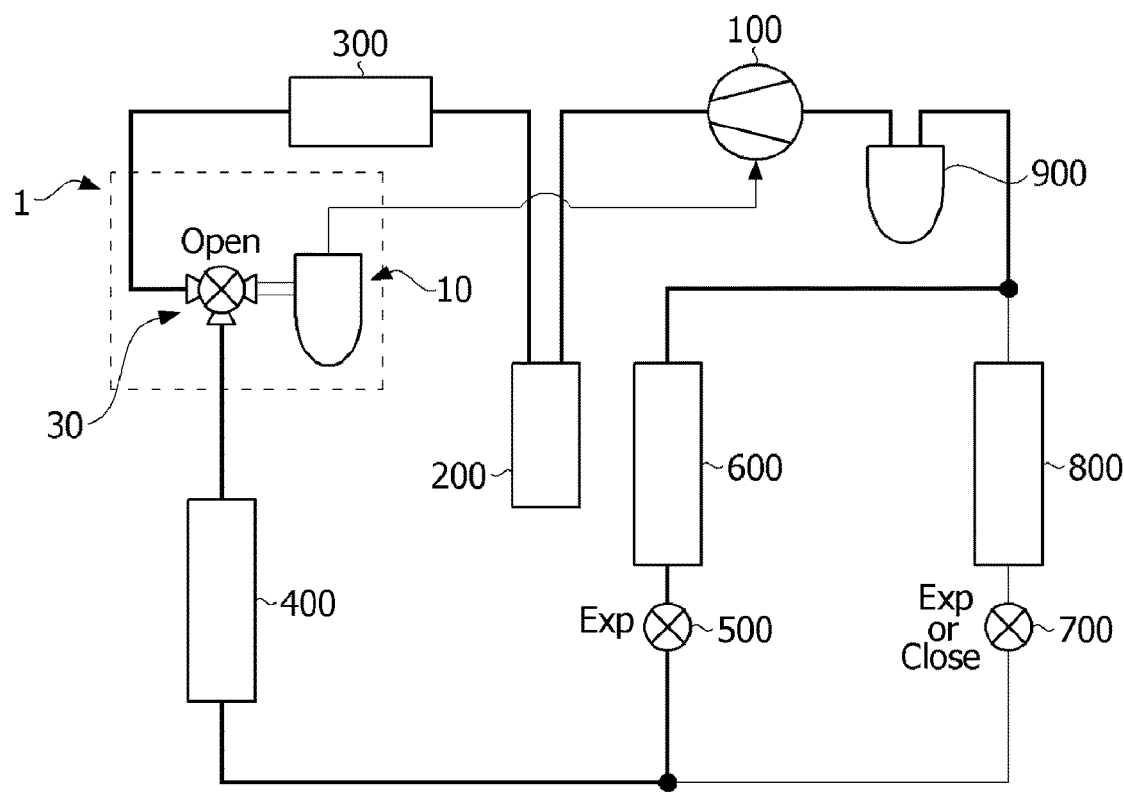
FIG. 10 is a view illustrating an operating state of the system in a cooling mode in FIG. 9.
Figure 11:
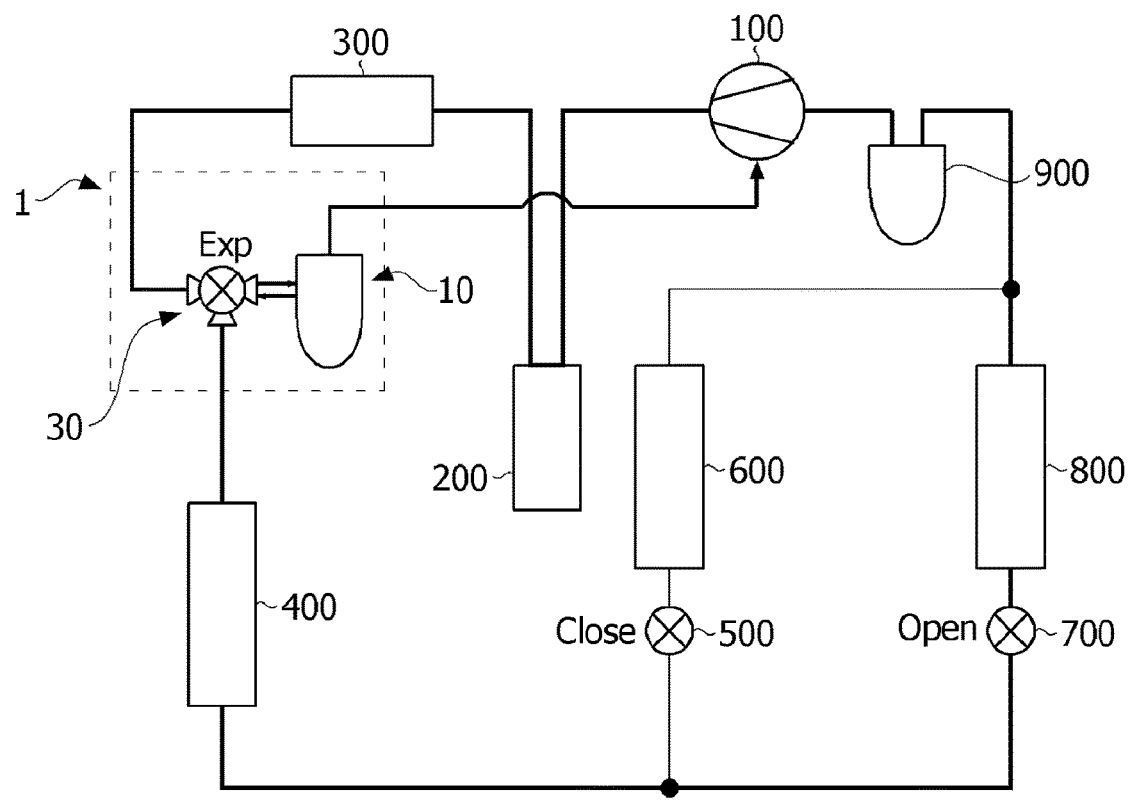
FIG. 11 is a view illustrating an operating state of the system in a vapor injection heating mode in FIG. 9.
Figure 12:
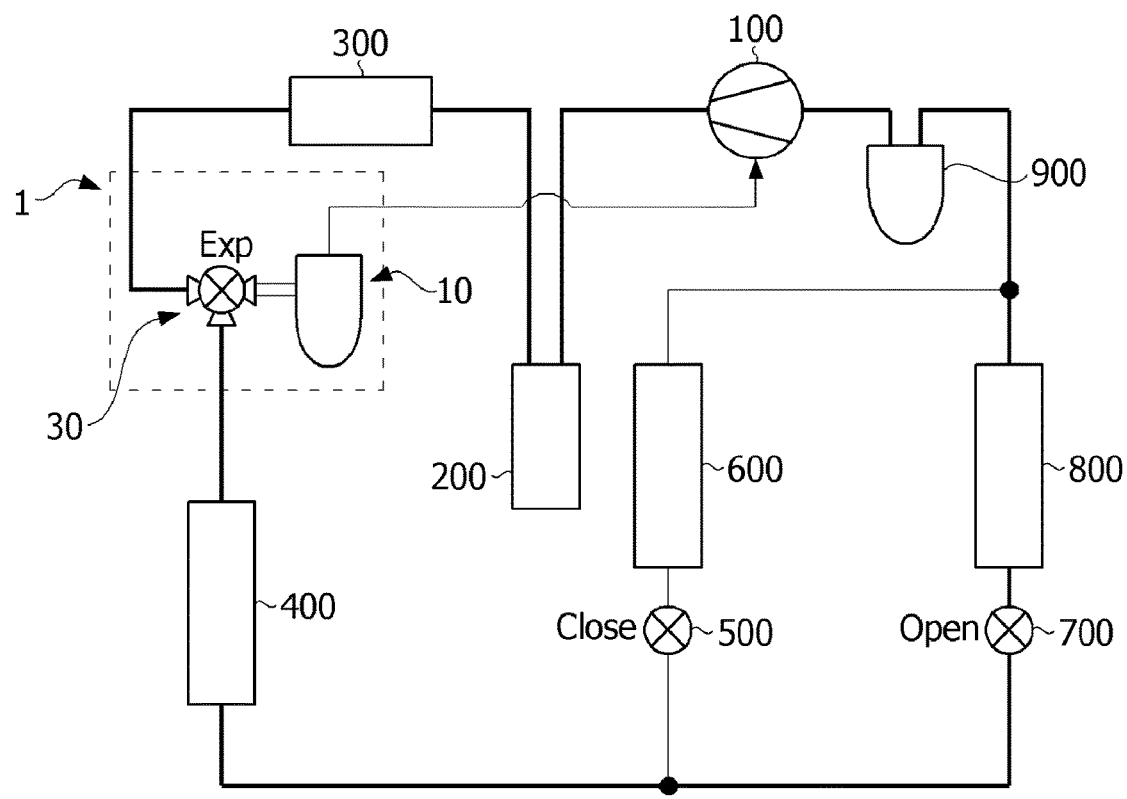
FIG. 12 is a view illustrating an operating state of the system in a general heating mode in FIG. 9.

FIG. 9 is a structural view of a heat pump system using the vapor injection module 1 according to another embodiment of the present invention, FIG. 10 is a view illustrating an operating state of the system in a cooling mode in FIG. 9, FIG. 11 is a view illustrating an operating state of the system in a vapor injection heating mode in FIG. 9, and FIG. 12 is a view illustrating an operating state of the system in a general heating mode in FIG. 9. Like reference numerals indicated in FIGS. 1 to 8 refers to like members in the description described with reference to FIGS. 9 to 12, and the detailed description of the identical members will be omitted.

Referring to FIG. 9, a vapor injection heat pump system according to another embodiment of the present invention may include the compressor 100, a condenser 300, an internal heat exchanger 200, an expansion valve 30, the gas-liquid separator 10, an external heat exchanger 400, a second expansion valve 500, an evaporator 600, a third expansion valve 700, a chiller 800, and an accumulator 900.

The compressor 100 operates by receiving power from an engine (internal combustion engine) or a motor. The compressor sucks the refrigerant, compresses the refrigerant into a high-temperature, high-pressure gaseous refrigerant, and then discharges the refrigerant to the condenser 300.

The internal heat exchanger 200 may heat the interior by allowing the refrigerant introduced from the compressor 100 to exchange heat with air conditioning air. The internal heat exchanger 200, together with the evaporator 600 to be described below, may be disposed in an air conditioning casing of the vehicle and heat the interior of the vehicle.

In one embodiment, the internal heat exchanger 200 may use the condenser 300 as a heat exchanger for heating the interior.

The refrigerant flowing through the internal heat exchanger 200 may exchange heat with the air, and the air, which has exchanged heat with the refrigerant, may be introduced into the interior and heat the interior.

In addition, the refrigerant in the internal heat exchanger 200 may exchange heat with a coolant, and the coolant, which has exchanged heat with the refrigerant, may exchange heat with the air for heating the interior.

As described above, an air-cooled heat exchanger or a water-cooled heat exchanger may be used as the internal heat exchanger 200.

In one embodiment, the internal heat exchanger 200 may further include the water-cooled condenser 300 configured to allow the discharged refrigerant and the coolant to exchange heat with each other. The water-cooled condenser 300 included in the internal heat exchanger 200 may exchange heat with the coolant flowing through the coolant line, and the coolant, which has exchanged heat with the water-cooled condenser, may heat the interior.

The condenser 300 serves as a condenser 300 in both the cooling mode and the heating mode. The condenser 300 may condense the compressed refrigerant. The refrigerant condensed by the condenser 300 flows along a line and is supplied to the vapor injection module 1. In one embodiment, the water-cooled condenser 300 may be used as the condenser 300.

The vapor injection module 1 may include the expansion valve 30 and the gas-liquid separator 10 therein.

The expansion valve 30 may block a flow of the condensed refrigerant or expand the condensed refrigerant and transmit the expanded refrigerant to the gas-liquid separator 10 in accordance with the air conditioning mode. The expansion valve 30 may be connected to the gas-liquid separator 10 and determine a movement direction of and whether to expand the refrigerant through the ball valve 31 disposed in the expansion valve 30.

The expansion valve 30 may determine the flow direction of the introduced refrigerant, determine whether to expand the refrigerant, and control the flow rate.

The gas-liquid separator 10 may separate the refrigerant having passed through the expansion valve 30 into a gaseous refrigerant and a liquid refrigerant, move the separated liquid refrigerant back to the expansion valve 30, and move the gaseous refrigerant back to the compressor 100.

The gas-liquid separator 10 may serve to separate the refrigerant into the gaseous refrigerant and the liquid refrigerant together with the accumulator 900 disposed before the refrigerant circulates through the refrigerant line and enters the compressor 100. However, there is a difference in that the accumulator 900 supplies the gaseous refrigerant to the compressor 100, whereas the gas-liquid separator 10 allows the separated liquid refrigerant to flow as it is.

The liquid refrigerant separated by the gas-liquid separator 10 may be supplied back to the ball valve 31 in the expansion valve 30, and the ball valve 31 may additionally decompress the liquid refrigerant separated by the gas-liquid separator 10.

The external heat exchanger 400 is an air-cooled heat exchanger and is installed at a front side of an engine room of the vehicle. The external heat exchanger 400, together with a radiator, is disposed in a straight line in a flow direction of air blown by a blower fan. In addition, the external heat exchanger 400 may exchange heat with the low-temperature coolant discharged from the radiator.

In addition, the external heat exchanger 400 may perform different functions in accordance with the air conditioning mode. In the cooling mode, the external heat exchanger 400 serves as the condenser 300 identical to the water-cooled condenser 300. In the heating mode, the external heat exchanger 400 serves as the evaporator 600 that performs a different function from the water-cooled condenser 300.

The second expansion valve 500 may be disposed at a side adjacent to an inlet of the evaporator 600 and perform functions of expanding the refrigerant, controlling the flow rate, and controlling the opening and closing operations.

The evaporator 600 is installed in the air conditioning casing and disposed in the refrigerant circulation line. During a process in which the low-temperature, low-pressure refrigerant discharged from the second expansion valve 500 is supplied to the evaporator 600 and air flowing in the air conditioning casing by the blower passes through the evaporator 600, the air exchanges heat with the low-temperature, low-pressure refrigerant in the evaporator 600 and is converted into cold air. Then, the cold air is discharged into the vehicle interior and cools an occupant compartment. That is, the evaporator 600 serves as the evaporator 600 in a refrigerant circulation line.

The third expansion valve 700 may be connected to the second expansion valve 500 in parallel and perform functions of expanding the circulating refrigerant, controlling the flow rate, and controlling the opening and closing operations.

The low-temperature, low-pressure refrigerant discharged from the third expansion valve 700 may be supplied to the chiller 800 and exchange heat with the coolant flowing in a coolant circulation line.

Meanwhile, the cold coolant made by heat exchange in the chiller 800 may circulate through the coolant circulation line and exchange heat with a high-temperature battery.

The accumulator 900 is installed in the refrigerant circulation line at a side adjacent to an inlet of the compressor 100. The refrigerant having passed through the evaporator 600 and/or the chiller 800 is merged into the accumulator 900. The accumulator 900 may separate the refrigerant into the liquid refrigerant and the gaseous refrigerant, supply only the gaseous refrigerant to the compressor 100, and store the surplus refrigerant.

A suction port of the compressor 100 may be connected to a gaseous refrigerant outlet of the accumulator 900. Therefore, it is possible to prevent the liquid refrigerant from being sucked into the compressor 100.

In the embodiment of the present invention, the expansion valve 30, the second expansion valve 500, and the third expansion valve 700 may perform expansion, communication, and blocking functions according to the respective modes. In other words, the respective expansion valves 30 may three functions of expanding the refrigerant, allowing the refrigerant to pass without being expanded, and blocking the refrigerant.

FIG. 10 is a view illustrating an operating state of the system in a cooling mode in FIG. 9.

Referring to FIG. 10, in the cooling mode, the compressor 100 operates, and the high-temperature, high-pressure refrigerant is discharged from the compressor 100. The compressed refrigerant flows to the internal heat exchanger 200 and is introduced into the water-cooled condenser 300 by bypassing the internal heat exchanger 200 that does not operate.

The refrigerant introduced into the water-cooled condenser 300 is cooled by exchanging heat with the coolant, and the cooled refrigerant is introduced into the vapor injection module 1 along the line.

The compressed refrigerant flows to the internal heat exchanger 200 and is introduced into the water-cooled condenser 300 by bypassing the internal heat exchanger 200 that does not operate. That is, both the water-cooled condenser 300 and the external heat exchanger 400 serve as the condenser 300 and condense the refrigerant.

A detailed operation of the expansion valve 30 will be described. The refrigerant is introduced through the inlet port 32 disposed in the expansion valve 30, and the refrigerant introduced into the inlet of the connection hole 31a flows to the outlet of the connection hole 31a. The actuator 50 rotates the ball valve 31 so that the outlet of the connection hole 31a is disposed to be directed toward the outlet port 33, such that the bypass operation may be performed on the introduced refrigerant.

In this case, the position of the second expansion region 31c may be controlled so that the inlet or the outlet of the second expansion region 31c is not directed toward the outlet port 33. In one embodiment, the inlet and the outlet of the second expansion region 31c may be disposed to be directed toward the sidewall on which the ball valve 31 is disposed.

Thereafter, the condensed refrigerant is throttled while passing through the second expansion valve 500, such that the refrigerant is expanded.

Thereafter, the expanded refrigerant passes through the evaporator 600 while exchanging heat with the air blown by the air blower (not illustrated) of the air conditioning casing, such that the refrigerant is evaporated, and the air is cooled. The cooled air is supplied to the vehicle interior and used to cool the vehicle interior. Further, the refrigerant evaporated by the evaporator 600 flows back into the compressor 100 via the accumulator 900 (90).

The remaining part of the refrigerant branching off from a refrigerant branch part passes through the third expansion valve 700.

In this case, the third expansion valve 700 is closed so that the refrigerant may be introduced into the evaporator 600, and the refrigerant may expand and enter the chiller 800.

After the refrigerant is throttled and expanded by the third expansion valve 700, the expanded refrigerant may exchange heat with the coolant while passing through the chiller 800, such that the refrigerant may be evaporated, and the coolant may be cooled. Further, the refrigerant evaporated in the chiller 800 flows back into the compressor 100 via the accumulator 900. As described above, the refrigerant having passed through the evaporator 600 and the refrigerant having passed through the chiller 800 merge with each other in the accumulator 900 and flow into the compressor 100. The refrigerant circulates as the above-mentioned process is repeated.

FIG. 11 is a view illustrating an operating state of the system in a vapor injection heating mode in FIG. 9.

Referring to FIG. 11, in the vapor injection heating mode, the compressor 100 operates, and the high-temperature, high-pressure refrigerant is discharged from the compressor 100. The compressed refrigerant flows to the internal heat exchanger and is introduced into the water-cooled condenser 300 by bypassing the internal heat exchanger 200 that does not operate.

The refrigerant introduced into the water-cooled condenser 300 is cooled by exchanging heat with the coolant, and the cooled refrigerant is introduced into the vapor injection module 1 along the line.

The refrigerant introduced into the vapor injection module 1 is introduced into the expansion valve 30 through the inlet port 32 and expanded to a middle pressure by the first expansion region 31b formed in the ball valve 31.

The expanded refrigerant flows toward the gas-liquid separator 10. The liquid refrigerant separated in the gas-liquid separator 10 flows back to the expansion valve 30. The liquid refrigerant is additionally decompressed to a low pressure and then introduced into the external heat exchanger 400.

In the vapor injection heating mode, an expansion pressure of the refrigerant is adjusted as the expansion valve 30 performs, in a stepwise manner, the second-stage expansion on the refrigerant introduced into the vapor injection module 1, which makes it possible to improve the efficiency.

Referring to the operation of the expansion valve 30 in the vapor injection module 1, the expansion valve 30 may primarily expand the condensed refrigerant and move the refrigerant to the gas-liquid separator 10, and the liquid refrigerant separated by the gas-liquid separator 10 may be secondarily expanded while passing through the expansion valve 30.

A detailed operation will be described. The refrigerant is introduced through the inlet port 32, and the refrigerant introduced into the inlet of the connection hole 31a flows to the outlet of the connection hole 31a. The actuator 50 may adjust the arrangement position of the first expansion region 31b formed at the end of the outlet port 33 by rotating the ball valve 31 and allow the refrigerant to flow to the connection passage 34 through the first expansion region 31b. The refrigerant flowing through the connection passage 34 is expanded to a middle pressure while passing through the first expansion region 31b and introduced into the gas-liquid separator 10. The first expansion region 31b may expand the introduced refrigerant to a middle pressure and reduce a load applied to the compressor 100, thereby improving heat exchange efficiency in an evaporator 600.

The refrigerant introduced into the gas-liquid separator 10 may flow downward while circulating along the sidewall of the housing 11 of the gas-liquid separator 10. The liquid refrigerant separated in the gas-liquid separator 10 may flow toward the movement passage 35, and the separated gaseous refrigerant may be discharged through the outflow passage 12.

The liquid refrigerant flowing through the movement passage 35 is secondarily expanded while passing through the second expansion region 31c of the ball valve 31. The refrigerant passing through the second expansion region 31c may be expanded to a low pressure, discharged to the outlet port 33, and supplied to the external heat exchanger 400.

The gaseous refrigerant separated in the gas-liquid separator 10 may flow back into the compressor 100. Therefore, because the refrigerant with a higher temperature than the refrigerant introduced from the accumulator 900 may flow back into the compressor 100, thereby improving the heating efficiency.

The refrigerant having passed through the external heat exchanger 400 absorbs heat of outside air while being evaporated by exchanging heat with the outside air. Thereafter, the refrigerant passes through the refrigerant branch part and the fully opened third expansion valve 700 and flows into the chiller 800. In the chiller 800, the refrigerant may be heated by exchanging heat with the coolant. Next, the refrigerant having passed through the chiller 800 flows back into the compressor 100 via the accumulator 900. In this case, the second expansion valve 500 is closed, such that the refrigerant may not flow to the evaporator 600. Therefore, the refrigerant circulates as the above-mentioned process is repeated.

FIG. 12 is a view illustrating an operating state of the system in a general heating mode in FIG. 9.

Referring to FIG. 12, in the general heating mode (non-vapor injection mode), the compressor 100 operates, and the high-temperature, high-pressure refrigerant is discharged from the compressor 100. The compressed refrigerant flows to the internal heat exchanger 200 and is introduced into the water-cooled condenser 300 by bypassing the internal heat exchanger 200 that does not operate.

The refrigerant introduced into the water-cooled condenser 300 is cooled by exchanging heat with the coolant, and the cooled refrigerant is introduced into the vapor injection module 1 while flowing along the line.

The expansion valve 30 disposed in the vapor injection module 1 may prevent the condensed refrigerant from flowing to the gas-liquid separator 10, expand the condensed refrigerant, and discharge the refrigerant.

A detailed operation will be described. The refrigerant is introduced through the inlet port 32, and the refrigerant introduced into the inlet of the connection hole 31a flows to the outlet of the connection hole 31a. The actuator 50 may adjust the arrangement position of the first expansion region 31b formed at the end of the outlet port 33 by rotating the ball valve 31 and operate to discharge the refrigerant toward the outlet port 33 through the first expansion region 31b.

In this case, the position of the second expansion region 31c may be controlled so that the inlet or the outlet of the second expansion region 31c is not directed toward the outlet port 33. In one embodiment, the inlet and the outlet of the second expansion region 31c may be disposed to be directed toward the connection passage 34 and the movement passage 35 where the inflow and outflow of refrigerant do not occur.

The expansion valve 30 expands the introduced refrigerant to a low pressure and introduces the refrigerant into the external heat exchanger 400, and the refrigerant is cooled by exchanging heat with outside air in the external heat exchanger 400. That is, both the water-cooled condenser 300 and the external heat exchanger 400 serve as the condenser 300 and condense the refrigerant.

The refrigerant having passed through the external heat exchanger 400 absorbs heat of outside air while being evaporated by exchanging heat with the outside air. Thereafter, the refrigerant passes through the refrigerant branch part and the fully opened third expansion valve 700 and flows into the chiller 800. In the chiller 800, the refrigerant may be heated by exchanging heat with the coolant. Next, the refrigerant having passed through the chiller 800 flows back into the compressor 100 via the accumulator 900. In this case, the second expansion valve 500 is closed, such that the refrigerant may not flow to the evaporator 600. Therefore, the refrigerant circulates as the above-mentioned process is repeated.

The embodiment of the present invention has been specifically described above with reference to the accompanying drawings.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the embodiments disclosed in the present invention and the accompanying drawings are intended not to limit but to describe the technical spirit of the present invention, and the scope of the technical spirit of the present invention is not limited by the embodiments and the accompanying drawings. The protective scope of the present invention should be construed based on the following claims, and all the technical spirit in the equivalent scope thereto should be construed as falling within the scope of the present invention.

DESCRIPTION OF REFERENCE NUMERALS

1: Vapor injection module
10: Gas-liquid separator
11: Housing
12: Outflow passage
13: Partition wall part
30: Expansion valve
31: Ball valve
31a: Connection hole
31b: First expansion region
32c: Second expansion region
32: Inlet port
33: Outlet port
34: Connection passage
35: Movement passage
50: Actuator
100: Compressor
200: Internal heat exchanger
300: Condenser
400: External heat exchanger
500: Second expansion valve
600: Evaporator
700: Third expansion valve
800: Chiller
900: Accumulator

The invention claimed is:

1. A vapor injection module comprising:
an expansion valve configured to allow a condensed refrigerant to pass therethrough or expand a condensed refrigerant in accordance with an air conditioning mode; and
a gas-liquid separator configured to receive the refrigerant from the expansion valve and separate the refrigerant into a gaseous refrigerant and a liquid refrigerant,
wherein the expansion valve has a plurality of expansion regions and performs operations of allowing the refrigerant to pass therethrough, performing first-stage expansion on the refrigerant, or performing second-stage expansion on the refrigerant in accordance with arrangement positions of the expansion regions,
wherein the expansion valve comprises a ball valve connected to an inlet port and configured to rotate, and the plurality of expansion regions is formed in the ball valve,
wherein the ball valve comprises:
a connection hole connected to the inlet port;

a first expansion region connected to the connection hole and configured to expand the refrigerant; and a second expansion region disposed at one side of the ball valve, wherein the expansion valve comprises an outlet port, and wherein in a cooling mode and a general heating mode among the air conditioning modes, the ball valve is rotated so that the second expansion region is not directed toward the outlet port.

2. The vapor injection module of claim 1, further comprising:

an actuator connected to the expansion valve and configured to control a position of the expansion valve.

3. The vapor injection module of claim 1, wherein in a vapor injection heating mode among the air conditioning modes, the expansion valve primarily expands the condensed refrigerant and moves the refrigerant to the gas-liquid separator, and the liquid refrigerant separated by the gas-liquid separator is secondarily expanded while passing through the expansion valve.

4. The vapor injection module of claim 1, wherein the gas-liquid separator separates the refrigerant into the gaseous refrigerant and the liquid refrigerant only in a vapor injection heating mode among the air conditioning modes including a cooling mode, a general heating mode, and the vapor injection heating mode.

5. The vapor injection module of claim 1, wherein the second expansion region is formed as a through-hole formed through the ball valve.

6. The vapor injection module of claim 1, wherein the first expansion region has a pair of groove structures disposed at an end of the connection hole so as to face each other.

7. A vapor injection module comprising:

an expansion valve configured to allow a condensed refrigerant to pass therethrough or expand a condensed refrigerant in accordance with an air conditioning mode; and a gas-liquid separator configured to receive the refrigerant from the expansion valve and separate the refrigerant into a gaseous refrigerant and a liquid refrigerant, wherein the expansion valve has a plurality of expansion regions and performs operations of allowing the refrigerant to pass therethrough, performing first-stage expansion on the refrigerant, or performing second-stage expansion on the refrigerant in accordance with arrangement positions of the expansion regions, wherein the expansion valve comprises a ball valve connected to an inlet port and configured to rotate, and the plurality of expansion regions is formed in the ball valve, wherein the ball valve comprises:

a connection hole connected to the inlet port;

a first expansion region connected to the connection hole and configured to expand the refrigerant; and a second expansion region disposed at one side of the ball valve, wherein the expansion valve comprises an outlet port, wherein the gas-liquid separator and the expansion valve are connected through a movement passage, and wherein in a vapor injection heating mode among the air conditioning modes, the second expansion region of the ball valve is rotated to connect the outlet port and the movement passage.

8. A vapor injection module comprising:

an expansion valve configured to allow a condensed refrigerant to pass therethrough or expand a condensed refrigerant in accordance with an air conditioning mode; and a gas-liquid separator configured to receive the refrigerant from the expansion valve and separate the refrigerant into a gaseous refrigerant and a liquid refrigerant, wherein the expansion valve has a plurality of expansion regions and performs operations of allowing the refrigerant to pass therethrough, performing first-stage expansion on the refrigerant, or performing second-stage expansion on the refrigerant in accordance with arrangement positions of the expansion regions, wherein the expansion valve comprises a ball valve connected to an inlet port and configured to rotate, and the plurality of expansion regions is formed in the ball valve, wherein the ball valve comprises:

a connection hole connected to the inlet port;

a first expansion region connected to the connection hole and configured to expand the refrigerant; and a second expansion region disposed at one side of the ball valve, wherein the gas-liquid separator comprises:

a housing having an internal space in which a refrigerant flows;

an outflow passageway disposed at an upper side of the housing and configured to discharge the gaseous refrigerant, the outflow passageway being provided in the form of a pipe to prevent an inflow of the liquid refrigerant; and a movement passage disposed at a lower side of the housing and configured to discharge the liquid refrigerant to the ball valve.

9. The vapor injection module of claim 8, wherein a connection passage connected to the housing is disposed so that the refrigerant introduced through the ball valve is discharged toward a sidewall of the housing.

10. The vapor injection module of claim 8, wherein a partition wall part is disposed at one side of the housing and configured to prevent the refrigerant from scattering.

* * * * *